(12) United States Patent
Danielsson et al.

(10) Patent No.: US 7,320,565 B2
(45) Date of Patent: Jan. 22, 2008

(54) EDGE-CARRYING DRILL, METHOD FOR THE MANUFACTURE OF THE DRILL, AND DRILLING TOOL COMPRISING SUCH A DRILL

(75) Inventors: Åke Danielsson, Sandviken (SE); Bengt Silver, Hagersten (SE)

(73) Assignee: Sandvik Intellectual Property AB, Sandviken (SE)

( * ) Notice: Subject to any disclaimer, the term of this patent is extended or adjusted under 35 U.S.C. 154(b) by 399 days.

(21) Appl. No.: 10/849,445

(22) Filed: May 20, 2004

(65) Prior Publication Data

US 2004/0265080 A1 Dec. 30, 2004

(30) Foreign Application Priority Data

May 20, 2003 (SE) ..................... 0301456

(51) Int. Cl.
*B23B 41/02* (2006.01)
(52) U.S. Cl. .................. 408/144; 408/227; 408/705; 408/83
(58) Field of Classification Search ............ 408/57, 408/59, 67, 199, 207, 209, 226, 227, 705, 408/81, 83, 144, 233, 229
See application file for complete search history.

(56) References Cited

U.S. PATENT DOCUMENTS

| | | | |
|---|---|---|---|
| 1,352,825 A * | 9/1920 | Meredith et al. ........... 408/207 |
| 2,969,699 A * | 1/1961 | Kleine ....................... 408/199 |
| 3,163,246 A * | 12/1964 | Vagins et al. ............. 175/420.1 |
| 3,191,463 A * | 6/1965 | Ladendorf ..................... 408/59 |
| 3,274,863 A * | 9/1966 | Faber ........................... 408/207 |
| 3,751,177 A * | 8/1973 | Faber ........................... 408/200 |
| 4,330,044 A * | 5/1982 | Orr et al. .................. 175/420.1 |
| 4,515,230 A * | 5/1985 | Means et al. ............. 175/420.1 |
| 4,527,931 A * | 7/1985 | Sarin ........................... 407/113 |
| 4,605,079 A * | 8/1986 | Leibee et al. ............. 175/420.1 |
| 4,762,445 A * | 8/1988 | Bunting et al. ............. 408/144 |
| 5,226,760 A * | 7/1993 | Nishimura .................... 407/54 |
| 5,273,379 A * | 12/1993 | Nishimura .................. 408/144 |
| 5,486,072 A * | 1/1996 | Green ........................... 407/32 |
| 5,791,838 A * | 8/1998 | Hamilton .................... 408/224 |
| 5,851,094 A   | 12/1998 | Bengt et al. |

(Continued)

FOREIGN PATENT DOCUMENTS

RU      2156180     9/2000

(Continued)

*Primary Examiner*—Daniel W. Howell
(74) *Attorney, Agent, or Firm*—Drinker Biddle & Reath LLP

(57) ABSTRACT

In a first aspect, the invention relates to an edge-carrying drill body (1) of the type that is intended for deep hole drilling, and which is rotatable around a geometric axis (C) as well as comprises a through channel (2) arranged for internal chip evacuation, which channel mouths in front and rear ends of the body. Characteristic of the invention is that one or more cutting edges (4) are made integrally with the rest of the body, more precisely from a hard material, such as cemented carbide or CERMET. In a second aspect, the invention also relates to a method for the manufacture of such a drill body. In a third aspect, the invention furthermore relates to a drilling tool for deep hole drilling.

13 Claims, 3 Drawing Sheets

U.S. PATENT DOCUMENTS

| | | | | |
|---|---|---|---|---|
| 5,860,773 | A * | 1/1999 | Blomberg et al. | 408/83 |
| 5,863,162 | A | 1/1999 | Karlsson et al. | |
| 5,964,553 | A * | 10/1999 | Blomberg et al. | 408/224 |
| 6,019,553 | A * | 2/2000 | Yakamavich, Jr. | 408/224 |
| 6,511,265 | B1 * | 1/2003 | Mirchandani et al. | 407/53 |
| 6,540,449 | B1 | 4/2003 | Bejerstål et al. | |
| 6,551,035 | B1 | 4/2003 | Bruhn et al. | |
| 6,595,305 | B1 * | 7/2003 | Dunn et al. | 175/420.1 |
| 6,637,521 | B2 * | 10/2003 | Saitta | 175/19 |
| 6,682,275 | B1 * | 1/2004 | Lindblom et al. | 408/59 |
| 6,684,968 | B2 * | 2/2004 | Bise et al. | 175/427 |
| 6,783,307 | B2 | 8/2004 | Lindblom | |
| 6,860,344 | B2 * | 3/2005 | Bise et al. | 175/430 |
| 6,899,495 | B2 | 5/2005 | Hansson et al. | |
| 6,915,867 | B2 * | 7/2005 | Bise | 175/420.1 |
| 6,948,890 | B2 * | 9/2005 | Svensson et al. | 408/59 |
| 7,004,691 | B2 * | 2/2006 | Nomura | 408/59 |
| 2003/0102824 | A1 | 6/2003 | Kramer | |
| 2003/0103824 | A1 | 6/2003 | Hansson et al. | |
| 2004/0033113 | A1 * | 2/2004 | Blomberg et al. | 408/233 |
| 2005/0025594 | A1 * | 2/2005 | Lindblom | 408/227 |

FOREIGN PATENT DOCUMENTS

| | | |
|---|---|---|
| SE | 509383 | 1/1999 |
| WO | 01/43899 | 6/2001 |
| WO | 01/98008 | 12/2001 |
| WO | 03/031104 | 4/2003 |
| WO | WO 2004103613 A1 * | 12/2004 |

* cited by examiner

EDGE-CARRYING DRILL, METHOD FOR THE MANUFACTURE OF THE DRILL, AND DRILLING TOOL COMPRISING SUCH A DRILL

This application claims priority under 35 U.S.C. §§ 119 and/or 365 to patent application Ser. No. 0301456-0 filed in Sweden on May 20, 2003, the entire content of which is hereby incorporated by reference.

BACKGROUND OF THE INVENTION

In a first aspect, this invention relates to an edge-carrying drill body, which is rotatable around a central geometric axis and comprises a through channel arranged for internal chip evacuation, which channel mouths (opens) in front and rear ends of the body.

In a second aspect, the invention relates to a method for the manufacture of edge-carrying drill bodies of the above-mentioned type.

In a third aspect, the invention also relates to a drilling tool, which includes an edge-carrying drill body of the kind in question.

DESCRIPTION OF THE PRIOR ART

Within the field of chip forming machining, deep hole drilling constitutes an area difficult to master, in particular when the holes should be extraordinary long or deep. By "long holes" is meant holes having a relatively great ratio of hole depth to hole diameter, usually hole depths of from 5×D up to 100×D or more. For the machining in question, drilling tools of two different main categories are usually used, viz. so-called ejector drills and STS drills (Single Tube System), respectively, the last-mentioned one of which includes a front drill body and at least one extending tube to which the drill body is detachably connected.

In the last-mentioned case, supply of the cutting fluid requisite for lubrication and cooling takes place along the outside of the tube, while the chip evacuation as well as the evacuation of the cutting fluid takes place internally via a through channel in the drill body and the interior of the tube. The drilling is usually carried out in special deep hole drilling machines that are constructed for optional operation method, e.g., rotary workpiece, rotary tool or a combination of both rotary workpiece and rotary tool. However, most common is that the workpiece rotates, while the tool solely performs the linear feed motion. Furthermore, it should be pointed out that drilling by means of STS drills may be carried out either by full drilling (when the hole is drilled in a solid material to a predetermined diameter in one single operation) or such as boring (cf. also reaming and broaching).

Generally, the drill bodies of deep hole drills are made from a basic body of steel or the like, as well as one or more cutting inserts of cemented carbide or CERMET, the cutting inserts including the cutting edge(s) that is(are) required for the chip removal. In coarser drills, viz. for hole diameters >25 mm, the cutting inserts may be fastened on the basic body either by being soldered onto the same, or be detachably connected to the basic body, e.g., by means of screws. In the last-mentioned case, the cutting inserts usually consist of indexable inserts. However, at small diameters (9-25 mm), only soldered cutting inserts are possible because the requisite means for clamping detachable cutting inserts would complicate and weaken the comparatively weak steel body too much. In both cases, however, not only the drill bodies as such, but also the manufacture of the same, are associated with a plurality of disadvantages. Thus, an aggravating disadvantage from the point of view of manufacturing technology is that the production cost becomes very high, in particular for drills having a small diameter. A disadvantage performance-wise of the drill bodies as such is that the same have to be made with asymmetrical tool geometry where the drill tip is displaced or eccentric in relation to the geometrical center axis of the drill body. In order to carry the radial cutting forces, the drill body has to be provided with at least two external strips, which have the purpose of supporting and guiding the drill body during the drilling operation.

The existence of said supporting and guiding strips may give rise to pressing-in of chips and particles in the machined hole surface and give rise to extreme generation of heat by the friction contact thereof with the hole surface. Furthermore, the strips intrude on the width of the chip inlet(s); something that in turn increases the risk of chip stopping and inferior chip breaking. Another disadvantage of the previously known drilling tools is that the same may be totally destroyed if the drill body were to become stuck in a workpiece, more precisely not only the front drill body but also the tube disposed therebehind are demolished upon jamming. It should also be pointed out that the precision of the drill bodies during machining may become mediocre, in particular after one or more exchanges of cutting inserts.

From for instance, PCT/SE 00/02073 (corresponding to U.S. Pat. No. 6,540,449), PCT/SE 02/01814 (Published WO 03/031104), PCT/SE 02/01916 (corresponding to Publication 2003/0091402-A1) and PCT/SE 02/02060 (corresponding to Publication 2003/0102824-A1), it is previously known to manufacture detachable machining bodies, so-called loose tops, which are made with one or more edges integrally with a basic body of cemented carbide and fastenable on a front end of a long narrow shaft. However, in that case, the machining body as well as the shaft lack every form of internal chip channel through which chips and cooling liquid may be evacuated internally in the way which is contemplated by the present invention.

OBJECTS AND FEATURES OF THE INVENTION

The present invention aims at obviating the above-mentioned disadvantages of previously known drilling tools for deep hole drilling and at providing an improved drilling tool. Therefore, in a first aspect, it is a primary object of the invention to provide an edge-carrying drill body, which can be series produced in a simple way at low cost, more precisely by eliminating the need for complementary mounting of separate cutting inserts.

An additional object is to provide a drill body, having a chip evacuation channel, the chip inlet(s) of which can be constructed with optimum width with the purpose of improving the chip breaking and counteracting the risk of chip stopping.

Yet another object of the invention is to provide a drill body that reduces the risk of total damage if the drill body were to become stuck in a workpiece.

Furthermore, it is an object to provide a drill body that can be made having different, desirable properties in different parts of the same.

Yet one more object of the invention is to provide opportunities for the manufacture of self-centring drill bodies in which the need for problematic supporting and guiding strips has been eliminated. It is also an object to provide a drill body that guarantees a good machining precision and that has a long service life.

An additional object of the invention is to provide a drill body, which during chip removal generates chips of a reduced width in order to facilitate the chip evacuation.

According to the invention, at least the primary object is attained by a drill body defining a center axis of rotation and including an internal through-channel for chip evacuation. The through-channel includes front and rear openings in the body. The body includes at least one cutting edge integral therewith.

In addition to the drill body as such, the invention also relates to a method for the manufacture of drill bodies of the kind in question. The features of this method include the step of forming the body with at least one cutting edge integral therewith.

In a third aspect, the invention relates to a drilling tool for deep hole drilling. The drilling tool comprises the aforementioned drill body plus a tube detachably connected to a rear end of the drill body.

The invention is based on the intention to manufacture drill bodies for deep hole drilling, i.e. drill bodies having an internal, through chip and cooling liquid channel, in one single piece in which one or more edges are integrated, the body in its entirety being made from the same fundamental type of material which is used in separate cutting inserts, in particular cemented carbide and CERMET, respectively. In this way, the drill body in its entirety can be made in one single lift in a suitable injection molding machine, each need for complementary mounting of separate cutting inserts being eliminated.

BRIEF DESCRIPTION OF THE DRAWINGS

The objects and advantages of the invention will become apparent from the following detailed description of preferred embodiments thereof in connection with the accompanying drawings, and in which like numerals designate like elements.

DESCRIPTION OF PREFERRED EMBODIMENTS OF THE INVENTION

In FIGS. 1-5, a first embodiment is shown of an edge-carrying drill body 1, which is rotatable around a central geometric axis C and comprises a through channel 2 arranged for internal chip evacuation. Said channel mouths (opens) in front and rear ends of the body 1 to form front and rear mouths, respectively.

Figure 1:
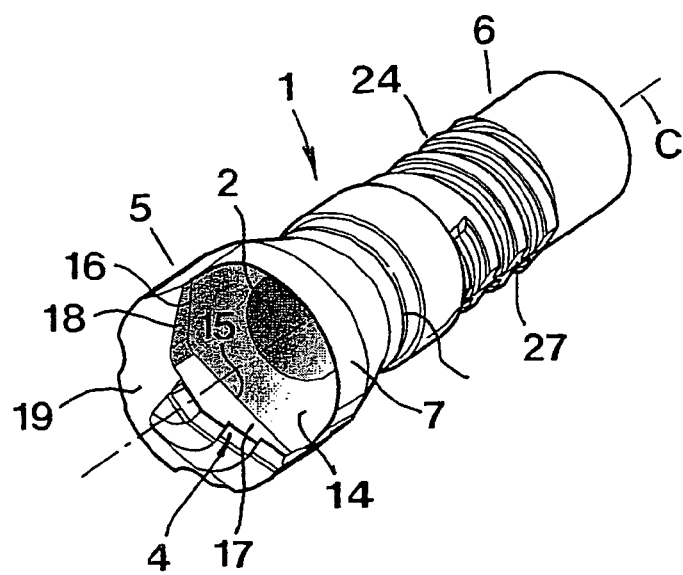
FIG. 1 is a perspective view regarded obliquely from the front of a first, single-edged embodiment of a drill body according to the invention.
Figure 3:
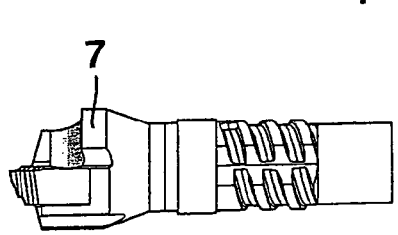
FIG. 3 is a first side view of the drill body regarded from the right in FIG. 2.
Figure 2:
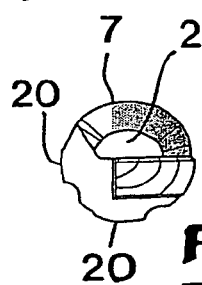
FIG. 2 is a somewhat diminished front view of the same drill body.
Figure 4:
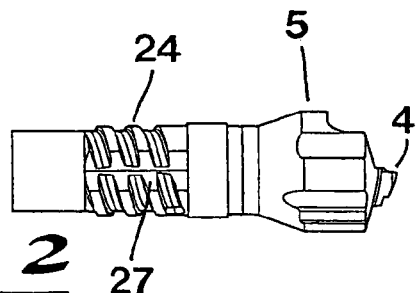
FIG. 4 is a second side view regarded from the left in FIG. 2.
Figure 5:
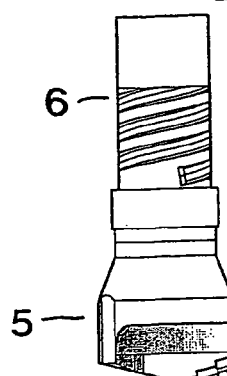
FIG. 5 is a planar view from above in FIG. 2.
Figure 6:
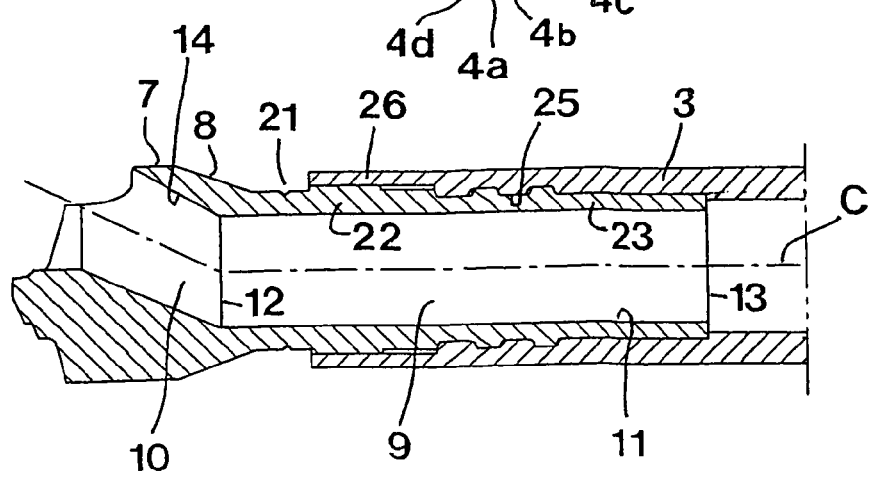
FIG. 6 is an enlarged longitudinal section through the same drill body mounted in a tube, which together with the drill body form an operative drilling tool.

The drill body 1 is connectable with a cylindrical tube 3 shown in FIG. 6, to form therewith an operative drilling tool of the type that, by those skilled in the art, is denominated STS drill (Single Tube System). Drills of this type are intended for deep hole drilling and are included in an extensive drilling equipment, which in the area of the rear end (not shown) of the tube 3 includes sealing devices via which cooling liquid can be introduced under pressure in the ring-shaped gap that is formed between the outside of the tube and a hole recessed by the drill body 1 in a workpiece. For this purpose, the tube 3 has an outer diameter that is smaller than the diameter of the recessed hole. Evacuation of the cooling liquid as well as the chips released by the drill body is carried out internally via the channel 2.

In the example shown, the drill body 1 includes a single cutting edge generally designated 4. In accordance with the invention, said cutting edge 4 is made integrally with the rest of the drill body, the body in its entirety being manufactured from a hard, wear-resistant material. In practice, the drill body is suitably manufactured from cemented carbide or CERMET, although also other materials having great hardness are feasible on condition that the hardness is considerably greater than the hardness of steel or the like. The technique to manufacture the drill body will be described more in detail below, reference being made to FIG. 7.

The drill body 1 comprises a front head 5, which carries the cutting edge 4, as well as a thinner, hollow shaft or sleeve 6. The head 5 has a cylindrical or rotationally symmetrical basic shape, i.e., a cylindrical or slightly conical envelope surface 7. Via a marked conical surface 8, the envelope surface 7 transforms into the shaft 6, which has a cylindrical or rotationally symmetrical basic shape.

The through chip channel, in its entirety designated 2, includes two different sections or bores 9, 10, the first-mentioned one of which is cylindrical and concentric with the center axis C. More precisely, the internal cylinder surface 11, which defines the bore 9, is entirely smooth from the front end 12 thereof to the rear opening 13. The front bore 10, which forms an inlet for the chips, extends generally at an oblique angle to the bore 9. The interior surface 14 that defines the chip inlet 10 has a partially conical and partially planar shape, more precisely in such a way that the inlet widens in the forward direction or outwards. Thus, the inlet is substantially funnel-like. Via two break lines 15, 16, the inlet transforms into two planar surfaces 17, 18, which extend at an obtuse angle to each other.

The front surface 19 of the head 5 has a generally conical shape in that the surface in question converges from the outer periphery toward the center of the drill body. The cutting edge 4 is formed in the transition between the planar surface 17 and the conical front surface 19, the surface 17 forming a cutting surface and the front surface 19 forming a clearance surface. Although the cutting edge 4, per se, could consist of an edge that is entirely straight from the center to the periphery, it has, in the embodiment shown, been preferred to form the edge in steps. More precisely, the cutting edge is formed with three different part edges 4a, 4b, 4c, the part edge 4a of which positioned closest the center is situated somewhat in front of the next following part edge 4b, etc. On the side of the center axis of the drill body which is opposite the front part edge 4a, a secondary part edge 4d is also formed, which cooperates with the part edge 4a to form therewith a front tip. By the fact that the cutting edge 4 in this way is composed of a plurality of different part edges, displaced axially in relation to each other, a plurality of different chips will be separated during the drilling, each chip being thinner than the total length of the cutting edge. In this way, chip breaking as well as chip evacuation is, to a large extent, facilitated.

Because the drill body 1 in this case includes only one cutting edge 4, at least two external guide strips 20 are required in order to support and guide the drill body during operation. These strips 20 are formed on the outside of the drill head and are circumferentially spaced. More precisely, one of the strips (a guiding strip) is located at a point approximately in linear extension of the cutting edge 4, while the other strip (a supporting strip) is displaced at an arc angle of approx. 90° in relation to the guiding strip.

The tubular piece of material that forms the shaft 6 includes a relatively thick, front wall section 22, as well as a thinner, rear wall section 23.

In order to connect the drill body 1 with the tube 3, these components are formed with connection means. In the example, said connection means can comprise threads. More precisely, a male thread 24 is formed on the shaft 6 of the drill body, while a female thread 25 is formed on the inside of the tube 3. In this connection, it should be pointed out that the front wall section 26 of the tube 3 is somewhat thinner than the rest of the tube wall. The male thread 29 is interrupted along circumferentially spaced areas on the shaft, to form planar, thread-free surfaces or formations. More precisely, said thread-free formations are located on diametrically opposed sides of the shaft, the individual thread sections being substantially semi-circular and defined at their opposite ends by wedge-shapedly tapering, substantially planar surfaces 27. The female thread 25 is, however, continuous. In this connection, it should be pointed out that the tube 3 is made from steel or the like, which can be machined by turning. Thus, the female thread 25 may be provided by conventional chasing of threads.

By forming flattened surfaces 27 in the above described way on opposite sides of the shaft, form-stripping of an initially formed greenware of the type that will be described below is made possible.

In the drill body 1, a fracture point, or breakage weakening is included, which in the example is in the form of a circumferential groove 21 in the envelope surface of the shaft 6. This groove is advantageously circular and located in a plane that extends perpendicularly to the center axis C. The groove is located between the transition surface 8 of the head 5 and the male thread 24 on the shaft. More precisely, the groove is located comparatively near the transition surface 8, whereby the same will be located in front of the front end of the tube 3 when the drill body is applied in the tube. By the existence of said breakage weakening 21, the drill body may be divided into two parts if the head were to become stuck in a workpiece. The tube 3 together with the separated, rear part of the drill body can, in that event, proceed to rotate without being demolished. If the groove extends perpendicularly to the center axis C, rotation of the tube (which at the rear end thereof is clamped in the drive mechanism of the drilling equipment) can be effected without axial forces being applied to the tube via the site of breakage. In this connection, it should, however, be pointed out that the groove or the breakage weakening also may be formed in such a way that the rotation of the drill tube is stopped. Thus, the groove may be inclined in relation to the center axis or be made curved or arched in order to, upon jamming of the drill body, apply an axial impulsive force to the drill tube, which stops the drive mechanism of the drilling equipment.

MANUFACTURE OF THE DRILL BODY ACCORDING TO THE INVENTION

Figure 7:
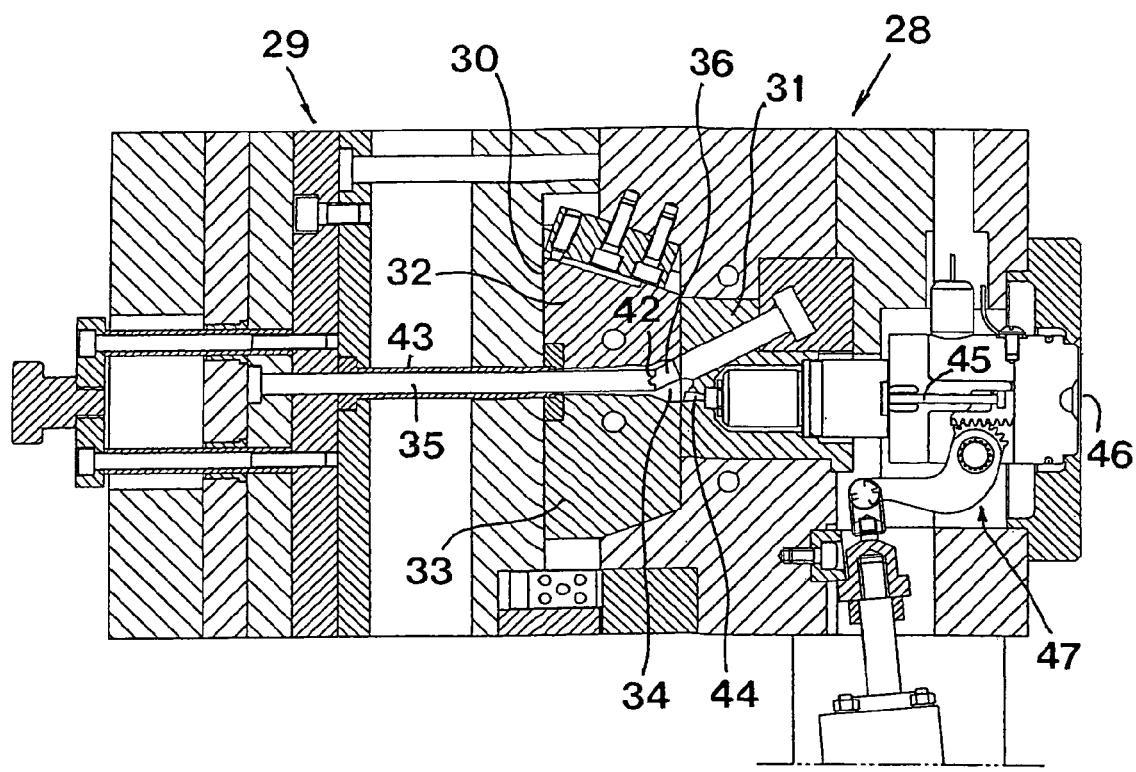
FIG. 7 is a schematic longitudinal section through a molding tool for the manufacture of the drill body according to FIGS. 1-6.

In order to explain the preferred method according to which the described drill body is series produced, reference is made to FIG. 7, which illustrates a molding tool especially constructed for the purpose, which is mountable in an injection molding machine (not shown). In this tool, two blocks 28, 29 are included, which are spaced-apart via an interface 30. The block 28 is fixedly mounted in the machine, while the block 29 is movable backwards and forwards in relation to the block 28. In the fixed block 28, three mold parts 31, 32, 33 are included, which together define a tool cavity designated 34. The mold part 31 is fixed in the block 28, while the two mold parts 32, 33 are spring-activated and movable to and fro relative to the mold part 31. More precisely, the mold parts 32, 33 are partially wedge-shaped in order to be pressed inwards towards each other to the position shown in FIG. 7 when the movable block 29 is pressed inwards towards the fixed block 28. However, when the block 29 is distanced from the block 28, the two mold parts 32, 33 are brought, by a number of springs (not visible), to be distanced not only from the mold part 31, but also from each other (the mold part 32 moves in the direction obliquely up towards the left in FIG. 7, while the mold part 33 moves obliquely down towards the left).

In the cavity 34, two core pullers or male plugs 35, 36 may be inserted, which at free ends thereof are formed so that they can be interconnected in a common connection point 42. On the outside of the male plug 35, which is in the form of a cylindrical bar, a likewise cylindrical ejector tube 43 is arranged. The cylindrical male plug 35 has the purpose of forming a vacant space in the cavity 34 with the aim of providing the bore 9 in the completed drill body 1. The second, oblique male plug 36 is partially conical and has the purpose of forming the chip inlet 10 in the completed drill body. Communicating with the cavity 34 is an inlet 44 which co-operates with a needle valve 45 by means of which the inlet may be opened and shut in order to batch-wise feed in a moldable, semi-plastic material compound received via feeding opening 46 from a store included in the machine. Opening and closing of the needle valve 45 is performed by a gear mechanism generally designated 47.

The shape of the internal part surfaces of the mold parts 31, 32, 33 which define the tool cavity 34 corresponds to the external shape of the drill body 1 to be made.

The compound which is injected in the cavity 34 contains a mixture of hard, cutting material-forming particles as well as a provisional, degradable adhesive. This provisional adhesive may in practice comprise a combination of different plastics and waxes, which can be stripped away by extraction followed by thermal evaporation or solely thermal evaporation. The concept "cutting material" as used in the present description and the subsequent claims should primarily be regarded to include cemented carbide and CERMET. Conventional cemented carbide is a powder metallurgical material, which essentially is built up by a number of carbides in at least one binder metal. The carbides that are of use are all very hard and may comprise primarily tungsten carbide (WC), but also titanium carbide (TiC), tantalum carbide (TaC) and niobium carbide (NbC), while the binder metal usually comprises cobalt (Co) or cobalt alloys. CERMET is, in turn, a common denomination of powder metallurgical material in which the hard particles comprise titanium carbide (TiC), titanium carbon nitride (TiCN) and/or titanium nitride (TiN). Characteristic of CERMET is that ceramic particles are also included in the binder metal, which for instance may comprise cobalt or nickel-cobalt.

The manufacture is carried out in the following way:

a) In a first step, the molding tool is closed by the movable block 29 being pressed inwards towards the fixed block 28 to the position shown in FIG. 7. In this connection, the two movable mold parts 32, 33 are brought together in the direction of the male plug 35 and at the same time are pressed against the fixed mold part 31 so as to establish the tool cavity 34. In conjunction hereby, also the male plugs 35, 36 are inserted into the tool cavity and are connected together at the connection point 42. In this state, the tool is ready for injection of the compound, wherein the internal surfaces of the mold parts will define the external shape of the body to be made, while the internal shape of the bores 9, 10 is determined by the male plugs 35, 36, b) In the next step, the compound is injected in the cavity 34 via the inlet 44. When the cavity has been filled with compound, a certain holding pressure is maintained during a suitable time in order to guarantee that the compound is stabilized and absolutely completely fills out the entire cavity. In this connection, a greenware is formed, the shape of which corresponds to the shape of the cavity and the male plugs.

c) In a third step, the formed greenware is form-stripped by retracting the male plug 36, as well as distancing the movable block 29 from the fixed block 28. In this connection, the two movable mold parts 32, 33 will on one hand be distanced from the fixed mold part 31, and on the other hand be distanced from each other and from the central male plug 35. The molded greenware remains on that occasion in an exposed state on the free end portion of the male plug 33. In order to remove the greenware from the male plug 35, the ejector tube 43 is projected out in the direction of the free end of the male plug.

d) When the greenware has been released, the adhesive is stripped away from the body. This takes place by extraction followed by thermal evaporation, or solely by thermal evaporation. When the adhesive has been stripped away, only the particles that are to form the final cutting material remain in the greenware. Either before or after this treatment, the riser which is formed in the inlet 44 may be removed from the front surface (the surface 19 on the completed drill body) of the greenware.

e) In a final step, the greenware treated in this way is sintered by heating to at least 1300° C. while obtaining a hardened drill body having the final shape and dimension. In connection with the sintering, the greenware shrinks linearly by 17 to 20% of the original dimensions thereof determined by the tool cavity 34.

Above, it has been described how a single homogeneous compound is injected in the molding tool. The described manufacturing method also presents possibilities for making the drill body from two or more material compounds having different properties. For instance, those material sections in which the cutting edge and the envelope surface of the head, respectively, are included, could be made from a material having greater hardness and resistance to wear than the material in other sections in the body. In practice, such multi-stage injection molding may be effected by one or more additional male plugs in addition to the two above-described being inserted in the tool cavity and being drawn out one by one when a first basic body has been formed in the cavity. These supplementing male plugs then leave hollow spaces, which in one or more later steps may be filled with powder compounds that give material having properties other than those of the material in the basic body. In this case, naturally one or more additional injection inlets are also required together with the appurtenant chambers for different powder compounds.

BRIEF DESCRIPTION OF ADDITIONAL EMBODIMENTS OF THE DRILL BODY

Figure 8:
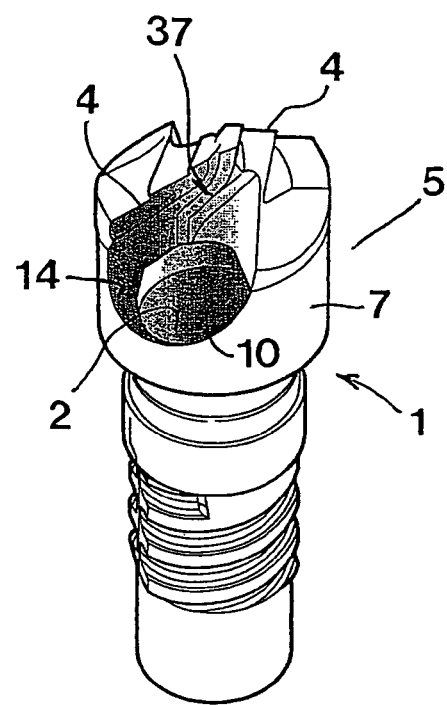
FIG. 8 is a perspective view of a drill body made with two cutting edges according to an alternative embodiment.
Figure 9:
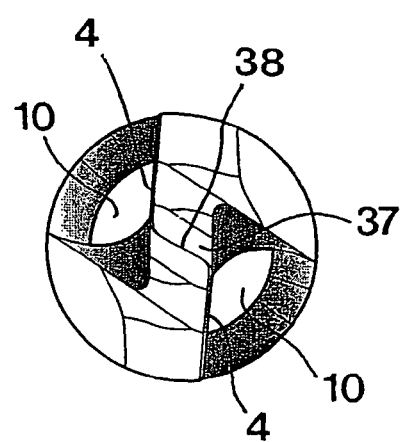
FIG. 9 is a front view of the drill body according to FIG. 8.

In FIGS. 8 and 9, an alternative embodiment is visualised according to which the drill body 1 is formed with two cutting edges 4, which are formed in a bridge designated 37, which bridges-over the through front opening of the channel 2. As is seen in FIG. 9, two chip inlets 10 are defined on opposite sides of said bridge 37, which inlets are located in the area in front of the appurtenant cutting edges 4 seen in the direction of rotation of the drill. The two edges 4 are generally diametrically opposed each other and mutually parallel, although displaced in relation to the geometrical center axis of the drill body. In this connection, the inner ends of the edges are interconnected via an inclined chisel edge 38, which in a conventional way may be formed with a center punch (not shown), which forms a centring tip in connection with the entering of the drill in a workpiece. Contrary to the asymmetrical, single-edged drill body according to FIGS. 1-5, the drill body shown in FIGS. 8 and 9 has a generally symmetrical geometry, more precisely in that the two cutting edges are equidistantly separated (180°) in the circumferential direction. This symmetrical geometry means that the cutting forces on the two edges balance out each other so that the drill becomes self-centering. For this reason, the head 5 of the drill body may be formed with an envelope surface 7, which is genuinely rotationally symmetrical and smooth in that it lacks protruding supporting and guiding strips. However, in this connection, it should be pointed out that a suitable number of circumferentially spaced, countersunk flutes may be formed in the envelope surface, which extend axially between the front and rear ends of the envelope surface and have the purpose of facilitating feed of cooling and lubrication liquid to the cutting edge.

Figure 10:
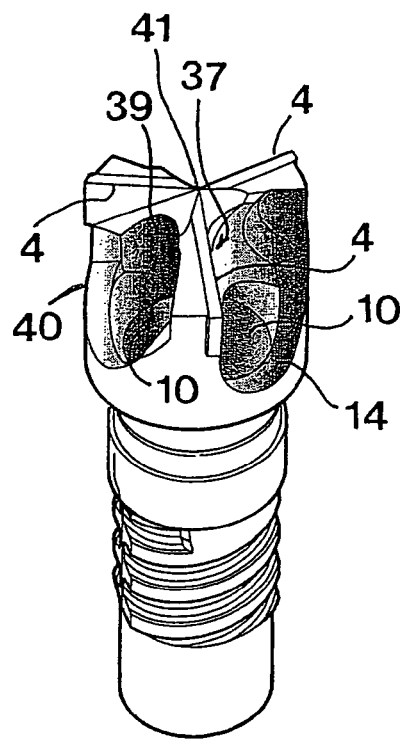
FIG. 10 is a perspective view of a third alternative embodiment according to which the drill body is made with three cutting edges.
Figure 11:
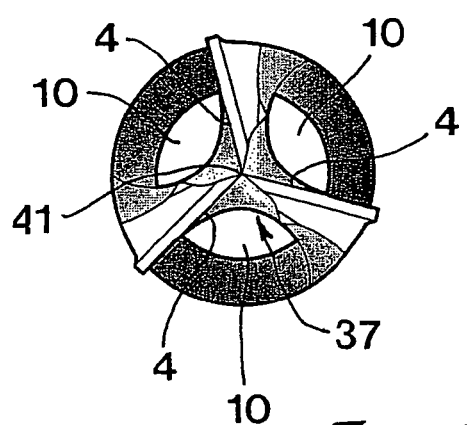
FIG. 11 is a front view of the drill body according to FIG. 10.

In FIGS. 10 and 11, a third embodiment is illustrated according to which a bridge 37 bridging-over the chip channel opening is formed with three integrated cutting edges 9. Thus, in this case, the bridge includes three bars or bar-like material portions 39, which emanate from a central intermediate portion of a ring-shaped wall 40 in which three countersinks are formed, which form respective chip inlets 10 for the internal, through chip channel. The surface 14 defining each individual chip inlet 10 (see also the surface 14 in FIG. 8) is partially cone-shaped in order to facilitate the transportation of the chips into and through the inlet. The three bars together with the appurtenant edges are mutually equidistantly spaced-apart in the circumferential direction, i.e. the separation between the same is 120°, the edges converging in a common point that forms a centring tip 91 located along the geometrical center axis of the drill body.

In the example according to FIG. 10, straight cutting edges 4 are shown. However, these could, like the cutting edges 4 according to FIG. 8 also be stair-shaped in order to produce part chips having a reduced width.

ADVANTAGES OF THE INVENTION

Within the range of deep hole drilling, the invention opens entirely new possibilities of efficient, cost efficient recession of deep holes in connection with full drilling as well as in connection with boring (and reaming and broaching, respectively). In particular, the invention enables the drilling of long holes having a limited diameter, e.g., diameters less than 15 mm, while guaranteeing an extremely good precision. One reason for this is that the drill body can be produced in one single piece without the need of time-consuming and precision-deteriorating complementary mounting of separate cutting inserts (irrespective of these being soldered or consisting of clamped indexable inserts). Another substantial advantage is that the invention makes it possible to manufacture self-centring drill bodies for deep hole drilling. This has previously not been possible in such drill bodies intended for deep hole drilling that make use of soldered cutting inserts or indexable inserts. A particular advantage in connection with self-centring drill bodies of the type that do not require supporting and/or guiding strips on the outside thereof is that the chip inlets may be formed with increased width, resulting in improved transportation of chips and reduced risk of chip stopping. Furthermore, by the existence of the particular breakage weakening (which can be made by the simple measure of giving the mold parts a suitable design), the advantage is gained that the risk of total damage of the entire drill tool is reduced to a minimum.

FEASIBLE MODIFICATIONS OF THE INVENTION

The invention is not solely limited to the embodiments described above and shown in the drawings. Thus, instead of a threaded joint, other types of connection means may be used, e.g., bayonet couplings, in order to detachably connect the drill body with the tube of the drill. It is also possible to connect the drill body with the tube in another way, e.g., by soldering or the like. In this connection, it should also be pointed out that the drill tube may be composed of a plurality of tube extension sections. Furthermore, it should be pointed out that the cutting geometry of the drill body as is determined primarily by the shape and location of the cutting edges on the head of the drill body, may vary most considerably within the scope of the subsequent claims. The drawings that have been used in order to illustrate the general idea according to the invention do not, accordingly, relate to any finished products and should only be regarded as principle drawings (which are influenced by preliminary prototypes of the final products). It should also be mentioned that the described breakage weakening may be realized in a way other than in the form of a continuous groove in the envelope surface of the shaft. Furthermore, it should be pointed out that the drill body also may be made from cutting materials other than the ones mentioned above, e.g. ceramics. Also, the different part edges of the individual cutting edge may be step-like displaced in relation to each other in another way than stair-shaped. For instance, the midmost part edge of three part edges may be countersunk (or raised) in relation to the two surrounding ones. Thus, an essential thing is that the different part edges are located on different levels in order to generate chips the width of which is smaller than the total width of the cutting edge.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A drill body for chip-removing metal machining, the drill body defining a center axis of rotation and comprising:
   a front head and a rearwardly extending hollow shaft adapted for connection with a tube, the front head including a first material;
   an axial through-channel for internal chip evacuation extending between at least one chip inlet opening in the front head and a chip outlet opening at a rear end of the shaft; and
   a cutting edge disposed behind the inlet opening with reference to a direction of rotation of the drill body, the cutting edge including a second material integrally sintered with the first material of the front head.

2. A drill body for chip-removing metal machining, the drill body defining a center axis of rotation and comprising:
   a front head and a rearwardly extending hollow shaft adapted for connection with a tube, the shaft including a male screw thread connecting the shaft to the tube, and the screw thread being interrupted along circumferentially spaced portions to form thread-free formations, and the front head including a first material;
   an axial through-channel for internal chip evacuation extending between at least one chip inlet opening in the front head and a chip outlet opening at a rear end of the shaft; and
   a cutting edge disposed behind the inlet opening with reference to a direction of rotation of the drill body, the cutting edge including a second material integrally sintered with the first material of the front head.

3. The drill body according to claim 2 wherein the cutting edge extends from a tip located along the axis to an outer periphery of the front head, the through-channel including a rear bore extending coaxially with the axis, and a front bore defining a chip inlet, the front bore forming an oblique angle relative to the axis, there being at least two circumferentially spaced strips disposed on the outer periphery of the body for guiding and supporting the head.

4. The drill body according to claim 3 wherein the chip inlet is generally funnel-shaped and narrows in cross-section in a direction toward the rear bore.

5. A drill body for chip-removing metal machining, the drill body defining a center axis of rotation and comprising:
   a front head and a rearwardly extending hollow shaft adapted for connection with a tube, the front head including a first material;
   an axial through-channel for internal chip evacuation extending between at least one chip inlet opening in the front head and a chip outlet opening at a rear end of the shaft;
   a bridge bridging over a front mouth of the through-channel to divide the mouth into a plurality of chip inlet openings; and
   a cutting edge disposed behind each of the plurality of inlet openings with reference to a direction of rotation of the drill body, the cutting edge including a second material integrally sintered with the first material of the front head, each cutting edge extending from a centering tip disposed on the axis to an outer periphery of the front head.

6. The drill body according to claim 5 wherein the plurality of chip inlet openings consists of three spaced apart by 120°, and the plurality of cutting edges consists of three spaced apart by 120°.

7. The drill body according to claim 5 wherein the plurality of cutting edges consists of two mutually parallel cutting edges, the cutting edges forming a chisel on which the centering tip is disposed.

8. The drill body according to claim 5 wherein the front head has a rotationally symmetrical envelope surface configured symmetrically relative to the axis and is free of guiding and supporting strips.

9. The drill body according to claim 1 wherein the at least one cutting edge is stepped to form part edges.

10. A deep-hole drilling tool comprising:
a drill body defining a center axis of rotation and including:
a front head and a rearwardly extending hollow shaft, the front head including a first material;
an axial through-channel for internal chip evacuation extending between at least one chip inlet opening in the front head and a chip outlet opening at a rear end of the shaft; and
a cutting edge disposed behind the inlet opening with reference to a direction of rotation of the drill body, the cutting edge including a second material integrally sintered with the first material of the front head; and
a tube detachably connected to the hollow shaft of the drill body.

11. The drill body according to claim 1 wherein the first and second materials comprise a single homogenous material.

12. The drill body according to claim 1 wherein the first material is different from the second material.

13. The drill body according to claim 12 wherein, relative to the first material, the second material comprises greater hardness and resistance to wear.

* * * * *